United States Patent Office 2,693,478
Patented Nov. 2, 1954

2,693,478

PREPARATION OF ESTERS OF OXALIC ACID

Alfred R. Bader, Milwaukee, Wis., assignor to Pittsburgh Plate Glass Company, Allegheny County, Pa., a corporation No Drawing. Application November 30, 1951, Serial No. 259,320

15 Claims. (Cl. 260—397.2)

The present invention relates to a method of forming esters of sterols and oxalic acid and to the novel esters obtained by application of the method.

It has heretofore been customary to form esters of various alcohols and carboxylic acids by a number of different methods such as direct reaction between the desired acids and alcohols or between chlorides of the acids or anhydrides of the acids and the alcohols. In general, these methods have involved rather drastic conditions of reaction, as for example, high temperatures and/or the use of catalysts and the like. These conditions of reaction often complicated purification of the products or the catalysts left as residues in the reaction mixture were hard to eliminate. Likewise the reaction was often incomplete and poor yields of the desired product were obtained. These difficulties were quite pronounced in the production of esters of higher molecular weight alcohols, e. g. steroid bodies.

THE PRESENT INVENTION

This invention is based upon the discovery that the sterols or steroid bodies, can easily be caused to undergo ester interchange with lower aliphatic esters of oxalic acid. Most commonly, the present invention involves an ester interchange reaction between a sterol or steroid body and a lower ester of oxalic acid under relatively mild temperature conditions and in such manner that the lower alcohol involved in the reaction is rapidly removed from the system or else the concentration thereof in the system is otherwise reduced to a low value. Mild conditions of reaction will be more fully described in subsequent portions of this specification.

The sterols are alcohols which may be isolated from the unsaponifiable residues of lipids derived from plant and animal sources. These compounds are of relatively high molecular weight containing from 17 to 30 or more carbon atoms. Sterols can be regarded as compounds containing or being derived from the cyclopentanoperhydrophenathrene ring structure and containing one or more alcoholic groups. These alcoholic groups may be primary, secondary, or tertiary or any combination thereof. The ring structure may be completely saturated or may contain from 1 to 3 or more double bonds.

The sterols generally contain the following ring structure:

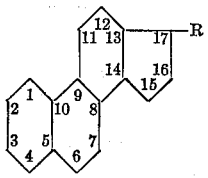

In the above structure, R may be H, OH, =O, straight chain or branched and either saturated or unsaturated hydrocarbon, or oxygenated or amino derivatives of the aforementioned hydrocarbons.

The above structure will contain one or more hydroxyl groups within the molecule appearing in either the ring or in a side chain or in both.

In addition a $CH_3$ group will generally appear at positions 10 and 13. (See Natural Products Related to Phenanthrene, Fieser and Fieser, Reinhold Publishing Corp.).

Closely related compounds which may be esterified according to this invention are the vitamins of the D group which usually are of the conventionalized formula:

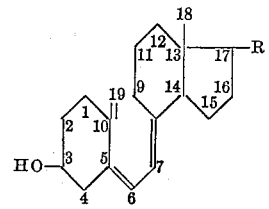

(see Chemistry and Physiology of the Vitamins, H. R. Rosenberg, 1945, Interscience Publishers, Inc., New York, page 341.) The preparation of oxalic acid esters of the vitamins of the D group is therefore regarded as being broadly embraced within the purview of the present invention. Such compounds and their substituted equivalents or isomers are included within the term "sterol" as herein used. Obviously the epimers and hydration products may be employed as starting materials for treatment with lower alkyl esters of oxalic acid.

While many of the sterols are isolated from natural sources, the use of such compounds prepared by synthetic methods is contemplated herein.

These sterols or sterol-like compounds are often comparatively sensitive to high temperatures and/or other conditions. However, many of them are important starting compounds in the synthesis of hormones and other biologicals. Yet in some of the reactions to which the compounds are subjected, it is desirable to protect the hydroxyl group from loss or from conversion to carbonyl form. It may also be desirable to convert the hydroxyl to ester form in order to increase the polarity of the compound or to provide reactive, or labile groups. By recourse to the present invention, the sterol or steroid compound may be esterified to produce the oxalic acid ester. These esters may be treated to introduce other radicals or to change the structure of the compound and thereafter the oxalic acid radical may be removed by hydrolysis to restore the hydroxy group to the modified steroid. The term "sterol" as used herein includes all hydroxylated steroids including Vitamin D compounds.

Typical sterols or hydroxy steroids which may be employed according to this invention include:

Table A

Cholesterol
Beta sitosterol
Stigmasterol
Cholestanol
Epidehydroandrosterone
Ergosterol
Ergostanetriol
Ergostadientriol
Strophanthidin
Lithocolic acid
Epicholestanol
Coprostanol
Steroid intermediates
Sterol sapogenins from various sources including dioscorea
Cortisone
Cholic acid
Desoxy cholic acid
Suprasterols
7-dehydrocholesterol
22-dihydroergosterol Triterpene alcohols such as:

Agnosterol
Lanosterol
Lumisterol

Other vitamins D such as:

Vitamin $D_3$, $D_4$, and $D_5$

Thus esters of sterols containing one, two, three or more alcoholic hydroxyls may be prepared. When the sterols containing two or more alcohol hydroxyl groups are treated, partial esters or completely esterified sterols or mixtures thereof may be obtained. When these are produced as mixtures, they may be separated by crystallization, molecular distillation, chromatography or other methods if desired.

In the practice of the present invention, diesters of various, lower monohydric aliphatic alcohols and oxalic acid may be employed. This group includes the oxalic acid esters of methyl alcohol, ethyl alcohol, propyl alcohol, isopropyl alcohol, butyl alcohol and isobutyl alcohol, containing no more than 6 and usually up to 4 carbon atoms. However, it is to be understood that the esters of oxalic acid and ethyl or methyl alcohol are usually preferred.

The hydroxy compound which is to undergo interchange with the lower esters of oxalic acid should be soluble in the latter or at least should be soluble in a solvent that is mutually compatible therewith.

CONDITIONS OF REACTION

The conditions of reaction employed to effect the ester interchange between the sterols or steroid compounds and the esters of oxalic acid and a lower alcohol such as herein disclosed may vary, dependent upon the ester and the hydroxy compound and whether it is desired to form diesters of the sterol or steroid or merely to form mixed esters. However, a special advantage of the process herein contemplated is that the conditions may be relatively mild thus insuring high yield and minimizing loss through decomposition. Catalysts are usually omitted but may be present if purity of product is not important. Usually the mixed oxalic acid ester of the higher alcohol and the lower alcohol is formed. However, by proper control of the conditions of reaction, the diesters of oxalic acid and the sterols or steroids can be formed. That is, both of the lower alcohol radicals or groups are replaced from the oxalic acid ester. The two types of reaction may proceed concurrently to form mixtures of the mixed ester and the diester in a single reaction mixture. The two types of reaction are represented by the following equations:

*Equation I*

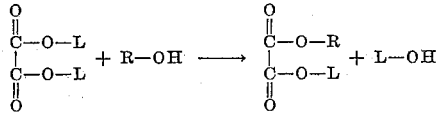

*Equation II*

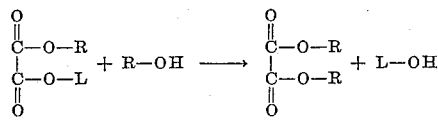

In the equations, the letter L indicates the hydrocarbon radical or group of a lower alcohol. The letter R represents the non-hydroxyl portion of a higher alcohol.

The temperature of reaction usually should be sufficiently high to drive off the evolved lower alcohol quite rapidly. This temperature may vary with reaction pressures, etc. Preferably, it should be driven off substantially as fast as it is liberated in the reaction mixture. The temperature of operation normally ranges between 50 and 150° C. or possibly 180° C. and is preferably below 120° C. The temperature should be below the point of decomposition of the reactants or of the desired reaction product. A good average temperature is approximately 90 to 100° C. (steam-bath temperature) and rarely above 120° C. The temperature can also be reduced below this value and the reaction may be conducted at room temperature where the excess of lower ester used is large and the time of reaction is long, for example, 24 hours or even several weeks. However, it is understood that as the temperature approaches, or is reduced below, the normal boiling point of the lower alcohol evolved in the system, it is desirable to apply vacuum or otherwise to attain low pressure of evolved alcohol in order to promote removal of the latter. Higher temperatures, preferably below 150° C. are permissible so long as side reactions do not seriously interfere with the yield of ester.

The approach of the upper limit of the temperature of reaction can, in many cases, be determined or detected by a tendency of the reaction mixture to darken. Such darkening indicates decomposition reactions in the mixture. If any tendency so to discolor is observed, the temperature of the reaction mixture should be reduced at once until darkening ceases. It is usually preferred to employ a temperature above the boiling point at operating pressures of the lower alcohol evolved in the system. This facilitates removal of the lower alcohol and causes reaction to proceed rapidly and smoothly to completion.

It is preferable that the concentration of the evolved lower alcohols such as methyl alcohol, ethyl alcohol or the like, dependent upon the alkyl radical of the oxalic acid ester, should be maintained at a relatively low value in the reaction mixture, or at least before the final conclusion of the reaction, the concentration of the lower alcohol should be carried to a low value.

A plurality of modes of attaining this low relative concentration of the evolved alcohol is permissible. For example, the system may be maintained under relatively high vacuum during the reaction thus stripping off the lower alcohol as it is formed, while permitting the temperature of the reaction to stay relatively low. Any oxalic acid ester of a lower alcohol carried over as a vapor in the lower alcohol vapors stripped off can be condensed and returned to the reaction zone. In this way, the concentration of the original oxalic acid ester in the system is maintained.

The reaction may also be conducted at atmospheric pressure and at a temperature which is lower than the boiling point of the lower ester of oxalic acid but which is higher than the boiling point of the evolved lower alcohol. This evolved lower alcohol is removed from the reaction thereby allowing the reaction to go essentially to completion.

According to a further embodiment, the lower evolved alcohol may be stripped off during the reaction, by blowing the reaction mixture with a non-reactive vapor or gas, e. g. nitrogen, $CO_2$ or the like.

Still another convenient method of attaining low concentration of evolved alcohol in the system comprises dilution of the alcohol of reaction by employing a high molecular excess of the ester of oxalic acid and lower alcohol. For example, the molecular ratio of the latter ester may be 5, 10, 20 or even 100 times that of the sterol or steroid body to be subjected to esterification through ester interchange reaction. In most of such instances, the original ester will be employed in a molecular ratio of at least 2 moles of said original ester per mole of alcohol to be esterified. At the conclusion of the reaction, the excess of the oxalic acid ester of a lower alcohol can be removed by appropriate distillation. Obviously, if the ratio of said lower ester tends to drop too low during the course of the reaction, additional ester can be added to bring the concentration thereof back to a satisfactory working level.

Combinations of these several methods are within the scope of this invention. For example, a 2 to 100 mole excess of a lower ester of oxalic acid can be employed and at the same time the alcohol of reaction can be removed as it is evolved. In this way, extremely low percentages of the lower alcohol are permitted to be established in the system. In systems containing excesses of lower esters of oxalic acid, stripping of evolved alcohol may be effected by simple distillation at atmospheric pressure, by vacuum distillation or by blowing the reaction mixture with a non-reactive gas or vapor.

When a molar excess, and particularly when a large molar excess of the lower ester of oxalic acid is employed, then the mixed oxalic acid ester is the major product of the reaction. When, however, two or more moles of higher monohydric alcohol per mole of the lower ester of oxalic acid are present in the reaction mixture and care is taken efficiently to remove the lower alcohol evolved, then the symmetrical diester is the major reaction product. For instance, the mixed ester, sitosteryl ethyl oxalate, will be the major product formed in the interchange reaction between a lower ester of oxalic acid and the sterol, sitosterol, when the quantity of lower ester of oxalic acids is present in molar excess to that of the sterol. If, however, the symmetrical diester, disitosteryl oxalate is the desired product, then the quantity of alcohol, in this case sitosterol, is used in molar equivalency or in excess over that of the lower ester of oxalic acid.

Due to the relative insolubility of many of the higher molecular weight alcohols in lower esters of oxalic acid, it may be desirable to use an inert solvent such as toluene, xylene, etc. in the reaction in order to dissolve the reactants but keep the quantity of lower ester to a minimum. This may be particularly advantageous in the preparation of certain symmetrical diesters in which reaction it is desirable to employ a quantity of lower esters of oxalic acid which is no greater than a molar equivalency to the hydroxyl groups present. It is usually relatively easy to separate symmetrical diesters of oxalic acid, such as disteryl oxalates from the higher alcohol and the mixed ester which may be present in the reaction product, because of the great insolubility of the symmetrical ester in many organic solvents such as hot acetone and alcohol in which the mixed ester and the higher alcohol are quite soluble.

Any mixed ester formed can of course be reacted further with the higher alcohol to yield the symmetrical oxalic acid ester.

By properly reducing the concentration of the evolved lower alcohol in the system, it is possible to obtain yields of sterol or steroid esters of oxalic acid of 90 per cent or even of practically quantitative values, e. g. 98 or 99 per cent based upon the sterol, without discoloration of the product of the reaction.

If care is observed to maintain the reaction temperature reasonably low and at the same time to distill off under vacuum, or otherwise remove or decrease the concentration of the alcohol evolved by reaction, highly efficient ester interchange can be effected with equimolar ratios of the sterol or steroid and the ester of oxalic acid and a lower alcohol or with but a slight excess of the latter ester.

When the reaction nears completion, any excess of the original ester can be distilled off. Vacuum may be applied to promote the distillation within permissible temperature limits in order that there may be no decomposition of any of the compounds. A pressure range of about 5 to 50 millimeters absolute, e. g. 15 millimeters of mercury is usually satisfactory for distilling off this excess of the ester of oxalic acid and the lower alcohol but such other subatmospheric pressure as will remove the excess ester at permissible temperatures may be employed. The distillation may be conducted at or near the original reaction temperature. In any event, the temperature should not exceed 180° C. and usually will be below 120 or perhaps 150° C. Of course, if absolute purity of products is not necessary the excess lower ester of oxalic acid may be removed by distillation at atmospheric pressure, thereby producing products which are somewhat contaminated due to the decomposition of compounds at these higher temperatures. In the distillation of the excess of the oxalic acid ester of a lower alcohol, any evolved lower alcohol in the system also distills off thus reducing the concentration of the latter with respect to the original ester of oxalic acid and the lower alcohol still present and assuring that if higher alcohol is still present in the system, the ester interchange is finally completed at moderate temperatures.

The main features involved in the process as they apply to the preparation of mixed or monoesters of higher alcohols, as herein disclosed, thus may be summarized as follows:

1. Mixed esters of lower alcohol, a mono or poly hydroxy sterol and oxalic acid, or diesters of monohydroxy sterols and oxalic acid, as well as polyesters of oxalic acid and polyhydroxy sterols, may be prepared according to this invention.

2. In the preparation of mixed sterol-lower alcohol esters of oxalic acid, it is advantageous to use an amount of oxalic acid ester of a lower alcohol of at least equimolar proportion with respect to the hydroxy group of the alcohol being subjected to ester interchange, and preferably it should be in substantial excess. In the production of esters of many alcohols, it is necessary to use an appreciable excess, for example, 50 per cent (molar basis) or more of the oxalic acid ester of a lower alcohol in order to dissolve the alcohol being esterified and/or to insure improved yields.

3. The concentration of the evolved alcohol in the reaction mixture should be retained as low as is feasible, e. g. not in excess of 33 molar per cent and preferably less with respect to the original amount of the oxalic acid ester of a lower alcohol. This may be effectively accomplished in several ways as for example, by distilling off the lower alcohol as formed either at atmospheric pressure or under diminished pressure, with the use of diminished pressure during the latter stages of the reaction being particularly advantageous, or by blowing with an inert gas or vapor or by the maintenance of a large excess of the oxalic acid ester of a lower alcohol.

4. Catalysts of reaction are not necessary and usually are not employed. They may however, at times, be used.

5. The temperature of the ester interchange should be moderate, e. g. 50 to 120° C. and in any event not above about 150 or 180° C. Satisfactory upper limits of temperature are determinable by observation of the initiation of decomposition reactions.

6. The temperature of reaction should be maintained until the lower alcohol ceases or substantially ceases to evolve.

7. Non-reactive solvents or solvents other than the excess of the oxalic acid ester of a lower alcohol are not ordinarily necessary in the reaction. However, it will be apparent that non-reactive liquid media which are common solvents of the system may also be employed if so desired. Examples of such inert diluents are toluene, benzene, xylene, petroleum naphthas, tetrahydrofuran, dioxan, etc. The use of water as a solvent medium in the system is to be avoided.

8. It is desirable at the conclusion of the reaction to distill off any excess of oxalic acid ester of a lower alcohol present in the reaction mixture along with any residual alcohol evolved by the reaction. If this is done any unreacted higher alcohol still present in the system will be induced to undergo reaction and thereby carry the reaction substantially to completion.

9. In the preparation of symmetrical oxalic acid esters of higher molecular weight monohydric alcohols, it is advantageous to use 2 moles or more of higher alcohol per mole of oxalic acid ester of lower molecular weight alcohol.

The esters of oxalic acids and a sterol or steroid which have been prepared within the scope of the present invention, are in general of high molecular weight. They are largely crystalline solids. They are especially useful as pharmaceuticals or as intermediates for the production of modified sterols, but may be used for various purposes.

The esters of the higher alcohols may be used as plasticizers, waxes and so forth, and also for purposes of producing intermediates which may be resinous or non-resinous.

The following examples illustrate the application of the principles of the invention.

EXAMPLE I

In this example, five grams of cholesterol and 50 grams of diethyloxalate were heated in a flask in the absence of catalysts and on the steam bath for 33 hours, the excess of diethyloxalate was then stripped off under vacuum, e. g. a vacuum of about 15 millimeters (absolute) and the residue after one crystallization from methanol yielded 4.7 grams of a white solid melting at 94.5 to 95.5° C. This product was monocholesteryl mono-ethyloxalate. It has a saponification value of 223 and in chloroform at 25° C., its specific rotation is $-33°$.

EXAMPLE II

Admix one gram of ergosterol and 30 grams of diethyloxalate and heat the mixture under a pressure of 70 millimeters on a steam bath for a period sufficient to complete the reaction, e. g. 4 hours. The excess diethyloxalate is then removed by distillation in vacuum and the residue is crystallized from ethanol-acetone mixture to yield 0.9 gram of ergosteryl ethyl oxalate.

EXAMPLE III

Seven grams of cholesterol, 30 grams of diethyl oxalate and 50 grams of toluene were mixed and heated for 20 hours on the steam bath under a vacuum. At the end of 3 hours, the toluene was completely distilled and the reaction was complete after 20 hours. It is to be understood that the time required for distillation of the toluene and concurrent removal of evolved alcohol can be controlled by appropriate change of the temperature or pressure in the reaction system. For example, as the pressure decreases, the speed of reaction increases due to the more complete removal of the alcohol evolved. The residue after the distillation, was refluxed in 100 cc. of a 1:1 mixture of ethanol and acetone which left 0.7 gram of a white solid undissolved. This solid was filtered off, washed with hot acetone and crystallized from a toluene-ethanol mixture to yield pure dicholesteryl oxalate of a melting point of 220 to 222° C. The ethanol-acetone filtrate on cooling deposited 6.2 grams of white crystals of a melting point of 93 to 94° C. This product was ethylcholesteryl oxalate. This example illustrates the ease of separation of the dicholesteryl oxalate, from the mixed ester, ethyl cholesteryl oxalate, through the much greater solubility of the latter in solvents such as ethanol and acetone.

EXAMPLE IV

In this example, 10 grams of sitosterol, 75 cc. of diethyl oxalate and 75 cc. of toluene were treated as in Example III. A yield of 0.7 gram of disitosteryl oxalate, melting point 194 to 195° C., and 7 grams of sitosteryl ethyl oxalate, of a melting point of 95° C. was attained.

Examples III and IV are illustrative of the use of an inert diluent (toluene) in the system. Toluene may be replaced by benzene, xylene, petroleum naphtha, tetrahydrofuran, dioxan, etc.

It will be apparent from the foregoing examples that it is possible to adjust the reaction conditions to produce either the essentially pure mixed ester of oxalic acid, a lower alcohol and a sterol, such as ethylcholesteryl oxalate, or to produce predominately the completely trans-esterified product such as dicholesteryl oxalate accompanied by small amounts of ethyl cholesteryl oxalate and cholesterol.

EXAMPLE V

Admix 10 grams of cholesterol and 100 cc. of dimethyloxalate. Heat the mixture on a steam bath to a temperature of 90 to 100° C. at atmospheric pressure for 24 hours. During the reaction, bubble carbon dioxide through the reaction to effect thorough removal of methyl alcohol from the reaction zone. Subsequently distill off the excess of dimethyl oxalate. In this distillation, a pressure of 15 millimeters (absolute) is satisfactory. Oxalate esters of cholesterol are thus obtained.

EXAMPLE VI

Ten grams of cholesterol in 100 cc. of dimethyl oxalate and 50 cc. of toluene are heated upon the steam bath as above described. During the reaction, a pressure of 40 millimeters of mercury (absolute) is maintained during the course of the reaction, methyl alcohol is evolved and it together with toluene and unreacted methyl oxalate are distilled off and the cholesterol esters of oxalic acid remain behind. The reaction may be considered complete or at least far advanced when methyl alcohol ceases to evolve.

When a polyhydroxy sterol is used in accordance with one of the above examples such as Examples I or II using at least one mole of ester per mole of hydroxy group in the sterol, the corresponding mixed esters such as ergostane mono, di or tri methyl or ethyl oxalate result. When sterol concentrations are higher, for example, two or more moles of sterol hydroxy groups per mole of lower alcohol ester, a polyester of oxalic acid is obtained.

It is to be understood that the mixed esters of oxalic acid, a lower aliphatic monohydric alcohol and a sterol may be selectively saponified with a base such as sodium or potassium hydroxide or calcium hydroxide in approximately stoichiometric amount selectively to split off the lower alkyl group. The resultant salts are somewhat water soluble. It is thus possible to provide water soluble forms of the sterols. The salts may also be reacted with an acid such as carbonic acid, sulfuric acid or the like to split off the metal of the salt and to form an oxalate ester of the sterol containing a free carboxyl. The carboxyl can react in the usual manner of such groups to provide numerous products. In this way, it is possible to form monocholesteryl esters of oxalic acid. In similar manner, it is possible selectively to saponify other sterol oxalates, such as those of stigmasterol and sitosterol. The salts can also be acidified to form free carboxyls. The mixed oxalic acid esters of sterols and lower alcohols may also be subjected to hydrolysis in order to split off the lower alcohol group, thus providing a half acid sterol ester.

The foregoing examples illustrate the application of the ester interchange reaction to individual sterols or steroids in a relatively pure state. It will be apparent that the compound which is to undergo ester interchange need not be pure. Various glyceride oil mixtures containing sterols in substantial amounts may be reacted to produce sterol esters of oxalic acid. For example, a soap stock which normally contains considerable amounts of sterols may be treated with methyl or ethyl oxalate (preferably the neutral esters) in accordance with the provisions of the present invention to form mono or disterol oxalates in admixture with glycerides of fatty acids or in admixture with fatty acids or various combinations of the glycerides and fatty acids or other constituents of the mixture. The temperatures of reaction and other conditions correspond to those herein disclosed. Many other mixtures of fat like products likewise include sterols which are susceptible to treatment in accordance with the provisions of the present invention.

Wool fat for example, includes a considerable amount of cholesterol and such cholesterol containing material may be treated with an excess of diethyl or dimethyl oxalate at temperatures near 100° C. to form cholesteryl esters of oxalic acid in the mixture. These cholesteryl esters can be recovered by solvent extraction or by other appropriate methods.

Likewise, tall oil as obtained in the digestion of paper pulp is rich in sterols and notably in beta-sitosterol. The distillation residues obtained after partial distillation of the rosin acids and fatty acids of tall oil are especially enriched in beta-sitosterol. The crude mixture can be treated with methyl or ethyl oxalates (neutral esters) to provide esters of beta-sitosterol in admixture with rosin acids, fatty acids and the like impurities of the tall oil residue.

Example VII 100 grams of unsaponifiable fraction of tall oil which consists largely of beta-sitosterol together with some higher aliphatic alcohols and other materials may be heated with 200 grams of dimethyl ester of oxalic acid and 500 grams of xylene at a temperature of about 100° C. for 24 hours. The excess of dimethyl oxalate and the xylene are then to be distilled off under a pressure of about 10 millimeters (absolute) to obtain a residue containing the desired beta-sitosteryl ester of oxalic acid and other high molecular weight esters.

According to this invention, modified sterols or steroids may be produced in a convenient manner using either the mixed or symmetrical sterols and oxalic esters of lower alcohols as intermediates. Prior to the present invention, it has been common to prepare derivatives of sterols or modified sterols by preliminarily blocking off the hydroxyl group by esterification, and subsequently preparing the derivatives. In such a case, it is common to esterify the sterol with acetic anhydride to produce the acetate. This steryl acetate is then subjected to treatment to modify the sterol radical. For example, the sterol radical may be oxidized, halogenated, or hydrogenated and thereafter oxidized in order to produce modified compounds. Following these reactions, the acetate group is hydrolyzed off and a modified sterol is thus obtained.

As a typical example, cholesterol has been reacted with acetic anhydride in order to produce the corresponding acetate. This product is then reacted with bromine to protect the double bond. The resulting product is then oxidized with chromic acid or like oxidizing agent to remove the side chain. Thereafter, the resulting oxidized product is debrominated and reacted with semicarbazide to precipitate the semi-carbazone from solution. Following this, the product is hydrolyzed to remove the semi-carbazide and acetate groups, with the resulting production of dehydroepiandrosterone. In some cases, it may be desirable to hydrolyze the acetate grouping to form the free alcohol prior to the preparation of the semi-carbazone. The reactions involved in such process are indicated to be as follows:

by blowing the reaction mixture with inert gas during the course of the reaction.

epidehydroandrosterone

According to the present invention, either mixed or symmetrical esters of oxalic acid and sterols may be prepared and these esters subjected to the treatment for the production of sterol oxidation products or other modifications of the sterol radical. Following this, the oxalic acid or the mixed ester thereof may, if desired, be hydrolyzed off with consequent regeneration of the sterol.

The forms of the invention herein described are by way of illustration. It will be apparent to those skilled in the art that numerous modifications may be made therein without departure from the spirit of the invention or the scope of the appended claims.

I claim:
1. In a method of forming an ester of oxalic acid and a sterol, the steps of heating a mixture of said alcohol and a diester of oxalic acid and an alcohol of relatively low molecular weight, the temperature of heating being sufficient to effect ester interchange and to liberate free lower alcohol but being below 180° C., and reducing the concentration of the evolved lower alcohol with respect to the ester of the lower alcohol to carry the reaction substantially to completion.
2. In a method of forming an ester of oxalic acid and a sterol, the steps of heating in the substantial absence of catalysts a mixture of said sterol and an oxalic acid ester of a lower alcohol to a temperature below 180° C. but sufficient to effect ester interchange and to liberate in the reaction mixture, free lower alcohol and maintaining the concentration of the evolved lower alcohol, with respect to the ester of the lower alcohol, sufficiently low to carry the reaction substantially to completion.
3. The steps as defined in claim 2 in which the reaction temperature is within the range of 90 to 120° C.
4. In a method of forming esters of oxalic acid and a sterol, the steps of heating a mixture of said sterol and an ester of oxalic acid and a lower alcohol, said ester being in a proportion of at least 2 mole equivalents with respect to the hydroxyl groups present in the sterol, the temperature being within a range sufficient to effect ester interchange but being below 180° C. whereby to liberate free lower alcohol.
5. The steps as defined in claim 4 in which the concentration of the evolved lower alcohol is reduced by effecting the reaction under vacuum.
6. The steps as defined in claim 4 in which the reaction is promoted by removing the evolved lower alcohol

7. The steps as defined in claim 4 in which excess of lower alcohol ester and the evolved lower alcohol are stripped off from the reaction mixture by vacuum distillation at the conclusion of the reaction.
8. The steps as defined in claim 4 in which the concentration of evolved lower alcohol is reduced by distillation.
9. The method of claim 8 in which the sterol is cholesterol.
10. The method of claim 8 in which the sterol is betasitosterol.
11. In a method of forming esters of oxalic acid and a sterol, the steps of heating to a temperature sufficient to effect ester interchange but below 180° C., a mixture of said sterol and a diester of oxalic acid and a lower alcohol in the presence of an inert diluent until a substantial proportion of the disteryl ester of oxalic acid is formed and then stripping off inert diluent, excess diester of oxalic acid and the lower alcohol and any residual free evolved lower alcohol present in the reaction mixture.
12. The steps of claim 11 in which the lower alcohol is monohydric and of 1 to 6 carbon atoms.
13. The steps of claim 11 in which the lower alcohol is monohydric and contains 1 to 2 carbon atoms.
14. A process of forming an ester of oxalic acid and a sterol in high yield comprising the steps of effecting ester interchange reaction between (A) an ester of a lower alcohol and oxalic acid and (B) said sterol.
15. A method of preparing a half acid ester of oxalic acid and a sterol which comprises the steps of preparing a mixed ester of oxalic acid and (A) a lower alkyl alcohol and (B) a sterol and splitting off the lower alcohol group to form said half acid ester and then removing the evolved lower alcohol.

References Cited in the file of this patent

UNITED STATES PATENTS

| Number | Name | Date |
|---|---|---|
| 1,433,308 | Steffens | Oct. 24, 1922 |
| 1,993,736 | Graves | Mar. 12, 1935 |
| 2,221,662 | Rothrock | Nov. 12, 1940 |

OTHER REFERENCES

Page et al., Biochem. Zeit. 220, pp. 320–321 (1930).